United States Patent
Yamano et al.

(10) Patent No.: US 10,095,145 B2
(45) Date of Patent: Oct. 9, 2018

(54) SILICONE OIL-TREATED SILICA PARTICLES AND TONER FOR ELECTROPHOTOGRAPHY

(71) Applicant: TOKUYAMA CORPORATION, Shunan-shi, Yamaguchi (JP)

(72) Inventors: Yuya Yamano, Yamaguchi (JP); Masahiro Nakamura, Yamaguchi (JP); Tadaharu Komatsubara, Yamaguchi (JP)

(73) Assignee: TOKUYAMA CORPORATION, Shunan-Shi (JP)

( * ) Notice: Subject to any disclaimer, the term of this patent is extended or adjusted under 35 U.S.C. 154(b) by 0 days.

(21) Appl. No.: 15/545,684

(22) PCT Filed: Jan. 21, 2016

(86) PCT No.: PCT/JP2016/000308
§ 371 (c)(1),
(2) Date: Jul. 22, 2017

(87) PCT Pub. No.: WO2016/117344
PCT Pub. Date: Jul. 28, 2016

(65) Prior Publication Data
US 2017/0363985 A1 Dec. 21, 2017

(30) Foreign Application Priority Data
Jan. 23, 2015 (JP) .................... 2015-011088
Aug. 7, 2015 (JP) .................... 2015-157151

(51) Int. Cl.
G03G 9/097 (2006.01)
C01B 33/18 (2006.01)
G03G 9/087 (2006.01)

(52) U.S. Cl.
CPC ......... *G03G 9/09775* (2013.01); *C01B 33/18* (2013.01); *G03G 9/08711* (2013.01); *C01P 2004/64* (2013.01); *C01P 2006/10* (2013.01); *C01P 2006/12* (2013.01)

(58) Field of Classification Search
CPC .............................................. G03G 9/09725
See application file for complete search history.

(56) References Cited

U.S. PATENT DOCUMENTS

| | | |
|---|---|---|
| 2001/0051270 A1 | 12/2001 | Yamashita et al. |
| 2003/0077533 A1 | 4/2003 | Murota et al. |
| 2004/0072091 A1 | 4/2004 | Mochizuki et al. |
| 2006/0150527 A1* | 7/2006 | Ohara .................... B82Y 30/00 51/308 |
| 2009/0230351 A1 | 9/2009 | Nagatani et al. |
| 2010/0009277 A1 | 1/2010 | Ogawa et al. |
| 2014/0295341 A1* | 10/2014 | Fomitchev ......... G03G 9/09716 430/108.22 |
| 2015/0003872 A1* | 1/2015 | Taniguchi .......... G03G 15/0233 399/176 |

FOREIGN PATENT DOCUMENTS

| | | | |
|---|---|---|---|
| JP | H02-308173 A | 12/1990 | |
| JP | 2002-351130 | * 4/2002 | .............. G03G 9/08 |
| JP | 2004-045668 A | 2/2004 | |
| JP | 2008-19157 A | 1/2008 | |
| JP | 2009-98700 A | 5/2009 | |
| JP | 2009-292915 A | 12/2009 | |
| JP | 4756040 B2 | 8/2011 | |
| JP | 2011-203496 A | 10/2011 | |
| JP | 2012-150172 A | 8/2012 | |
| JP | 2014-174475 A | 9/2014 | |
| JP | 2014-174501 A | 9/2014 | |
| JP | 2015-011131 A | 1/2015 | |
| WO | 01/42372 A1 | 6/2001 | |
| WO | 2009/139502 A1 | 11/2009 | |

OTHER PUBLICATIONS

JP 2002-351130 published Apr. 2002.*
Schaefer and Martin, "Fractal Geometry of Colloidal Aggregates", Physical Review Letters, vol. 52, Issue 26, Jun. 25, 1984, pp. 2371-2374.
JP Notification of Reasons for Refusal dated Mar. 15, 2016 as received in Application No. 2015-157151 (English Translation).
JP Decision to Grant a Patent dated Aug. 2, 2016 as received in Application No. 2015-157151 (English Translation).
Surface Science 1984, vol. 5, No. 1, pp. 35-39.

* cited by examiner

*Primary Examiner* — Peter L Vajda
(74) *Attorney, Agent, or Firm* — Maschoff Brennan

(57) ABSTRACT

A silicone oil-treated silica particle according to the present invention includes a silica particle body and silicone oil. The silica particle body has a BET specific surface area of 70 $m^2/g$ to 120 $m^2/g$. The silica particle body has been surface-treated with the silicone oil. The amount of free silicone oil liberated from the surface of the silica particle body in the silicone oil accounts for 2.0 mass % to 5.0 mass % with respect to the silica particle body. A surface-treated styrene acrylic resin particle, in which 2 parts by mass of the silicone oil-treated silica particle has been added to 100 parts by mass of a styrene acrylic resin particle having a particle size median of 5 μm to 8 μm, has a degree of agglomeration of 18% or less.

5 Claims, No Drawings

SILICONE OIL-TREATED SILICA PARTICLES AND TONER FOR ELECTROPHOTOGRAPHY

TECHNICAL FIELD

The present disclosure relates to a silicone oil-treated silica particle and an electrophotographic toner including such a particle. More particularly, the present disclosure relates to a silicone oil-treated silica particle, comprised of a silica particle body and silicone oil, and an electrophotographic toner including such a particle.

BACKGROUND ART

A toner for use as a developing powder for photocopiers, laser printers and other machines in the field of electrophotography often includes an external additive to impart some flowability to the toner, improve its charging efficiency, control the quantity of charge stored, and for other purposes. Silica is generally used as such an external additive.

Recently, photocopiers and printers have been increasingly required to operate at even higher speeds, have a further reduced overall size, even higher color reproducibility, and enhanced image quality or resolution, and achieve other improvements. The toner for use in those high-performance copy machines and printers has also been designed and developed to meet such a growing demand.

Among other things, maintaining good stabilized image quality for a long time is one of essential requirements in the field of electrophotography. To achieve this, the properties of silica, generally used as an external additive to a toner, have been studied from various angles. See, for example, Patent Documents 1, 2, and 3.

Silica is present as an agglomerate with a size on the order of a few ten μm to several hundred μm. This agglomerate is formed as a physical agglomerate of a plurality of agglomerated primary particles, each of which has been formed as an agglomerate, via chemical bonds, of a plurality of primary particles, each having a particle size on the order of a few nanometers to several ten nanometers. Major roles to be played by silica in a toner include imparting some flowability to the toner and stabilizing its charging characteristic. To fulfill these roles, silica needs to undergo an appropriate surface treatment, not just have the size and properties of those agglomerated silica particles controlled properly. Patent Documents 1-3 disclose silica subjected to a surface treatment with silicone oil.

CITATION LIST

Patent Documents

Patent Document 1: Japanese Unexamined Patent Publication No. 2009-98700

Patent Document 2: Japanese Unexamined Patent Publication No. 2014-174475

Patent Document 3: Japanese Unexamined Patent Publication No. 2014-174501

SUMMARY OF INVENTION

Technical Problem

The present inventors discovered that attempts to further increase the printing speed, or further improve the image quality or resolution, of those photocopiers and printers often caused agglomeration in a known toner including silica as an external additive, thus resulting in so-called "color missing," "density irregularity," and other kinds of failure during printing.

In view of the foregoing background, it is therefore an object of the present disclosure to provide a silicone oil-treated silica particle serving as an external additive to a toner and contributing to enhancing the print quality by reducing such color missing and density irregularity during printing.

Solution to the Problem

A silicone oil-treated silica particle according to an aspect of the present disclosure includes a silica particle body and silicone oil. The silica particle body has a BET specific surface area of 70 $m^2/g$ to 120 $m^2/g$. The silica particle body has been surface-treated with the silicone oil. The amount of free silicone oil liberated from the surface of the silica particle body in the silicone oil accounts for 2.0 mass % to 5.0 mass % with respect to the silica particle body. A surface-treated styrene acrylic resin particle, in which 2 parts by mass of the silicone oil-treated silica particle has been added to 100 parts by mass of a styrene acrylic resin particle having a particle size median of 5 μm to 8 μm, has a degree of agglomeration of 18% or less. As used herein, the "styrene acrylic resin" refers to a resin in which styrene and either acrylic acid or acrylic acid alkyl ester are copolymerized together.

In one exemplary embodiment, respective fractal shape parameter α values of the silica particle body in measurement ranges of 20-30 nm, 30-40 nm, and 50-70 nm have a maximum value $\alpha_{max}$ of 2.9 or more.

In another exemplary embodiment, the silica particle body has a particle density of 2.23 $g/cm^3$ or more as measured by an He gas pycnometer method.

In another exemplary embodiment, the silica particle body has an apparent density of 20 g/l to 35 g/l.

An electrophotographic toner according to the present disclosure includes, as an external additive, the above-described silicone oil-treated silica particle.

A method of making a silicone oil-treated silica particle according to the present disclosure includes the steps of: providing a silica particle body having a BET specific surface area of 70 $m^2/g$ to 120 $m^2/g$; and adding silicone oil to the silica particle body to coat the surface of the silica particle body with the silicone oil, thereby obtaining the above-described silicone oil-treated silica particle.

Advantages of the Invention

When used as an external additive to an electrophotographic toner, a silicone oil-treated silica particle according to the present disclosure increases the toner's flowability and significantly reduces the chances of toner's agglomeration, thus reducing color missing and density irregularity during printing.

DESCRIPTION OF EMBODIMENTS

Embodiments of the present disclosure will now be described in detail with reference to the drawings. The following embodiments are merely exemplary ones in nature, and are not intended to limit the scope, applications, or use of the present disclosure. Note that in the drawings attached herewith, any pair of components shown in multiple drawings and having substantially the same function will be designated by the same reference character for the sake of simplicity of description.

Embodiments

A silicone oil-treated silica particle according to an embodiment includes a silica particle body surface-treated with silicone oil. In the following description, the silica particle body yet to be surface-treated with the silicone oil will be hereinafter simply referred to as a "silica particle." The silica particle body surface-treated with the silicone oil will be hereinafter referred to as a "silicone oil-treated silica particle."

A silicone oil-treated silica particle according to this embodiment may be used not only as an external additive to a toner or a powder paint but also as a filler for various types of resin materials including epoxy resins and acrylic resins. Among other things, the silicone oil-treated silica particle may be used as an external additive to an electrophotographic toner particularly effectively because the particle has excellent dispersivity and will impart good flowability.

In an electrophotographic toner, the silicone oil-treated silica particles are added as an external additive to particles of a styrene acrylic resin or a polyester resin, which is a material for the toner, and then stirred up and mixed together with the resin particles to be deposited on the surface of the resin particles. It is known that dispersion of the silicone oil-treated silica particles to agglomerated particles having a size on the order of sub-micrometers or less before being deposited on the surface of those resin particles would improve the flowability and charging characteristic of the toner. However, imposing tighter electrophotographic printing conditions on a known toner often results in insufficient print quality. To overcome this problem, the present inventors studied the properties of the toner from various angles to come up with the technique disclosed herein. Specifically, the present inventors discovered that establishing a predetermined relationship between the particle size of the silica particles (defined by their BET specific surface area), the amount of free silicone oil of the silicone oil-treated silica particles surface-treated with the silicone oil, and the degree of agglomeration of a toner including the silicone oil-treated silica particles (replaced with a pseudo-toner) would enhance the print quality. The present inventors also discovered that the fractal shape parameter, particle density, and apparent density of the silica particles also suitably satisfy a predetermined relationship. These discoveries will be described in further detail below.

The silica particles to serve as a base material contain little water and are suitably dry process silica. Dry process silica is formed with a silicon compound fed into flames. Such silica particles have little water and few particles of a large size. Thus, when used as an external additive, such silica particles would impart good flowability and charging characteristic to the toner resin. Among other things, silica particles, formed by a flame pyrolysis of chlorosilane generally called "fumed silica," are used suitably.

An exemplary method of making the dry process silica is disclosed, for example, in Japanese Unexamined Patent Publication No. 2008-19157. Specifically, the method uses a burner with a multi-tube structure comprised of a center tube and a first annular tube arranged to surround the outer periphery of the center tube. According to the method, combustion is carried out with a mixture containing a gas of a siloxane compound and an oxygen gas supplied into the center tube of the burner, and with an auxiliary gas including, as a combustible component, either a hydrogen gas or a hydrocarbon gas supplied into the first annular tube of the burner, thereby making dry process silica particles. Alternatively, dry process silica particles may also be formed by a flame pyrolysis of chlorosilane generally called "fumed silica."

In this embodiment, the silica particles have a BET specific surface area of 70 $m^2/g$ to 120 $m^2/g$. If the BET specific surface area were less than 70 $m^2/g$, the silica particles would have too large a particle size to avoid desorbing from the toner surface easily, thus possibly causing a decline in the flowability and spacer adding effect that are beneficial functions of the external additive. Meanwhile, if the BET specific surface area were greater than 120 $m^2/g$, the silica particles would have too small a particle size to avoid causing a decline in the spacer adding effect. In an exemplary embodiment, the silica particles suitably have a BET specific surface area of 80 $m^2/g$ to 90 $m^2/g$. This is because using such silica particles as an external additive to a toner would further improve the toner's flowability and spacer adding effect. The BET specific surface area of the silica particles varies according to the manufacturing method and conditions of the silica particles.

In this embodiment, the silica particles suitably have a fractal shape parameter αmax of 2.9 or more when the lower limit of the measurement range is equal to or greater than 20 mm. The fractal shape parameter is a "fractal shape parameter (α value) representing an index to the particle shape" and corresponding to the frequency of occurrence of periodic structures of various dimensions. Details of the fractal shape parameter are disclosed, for example, by D. W. Schaefer et al. in Physical Review Letters, Volume 52, Number 26, pp. 2371-2374 (1984). Note that the content of this article is hereby incorporated by reference.

Specifically, the α value may be measured by small-angle X-ray scattering measurement. The small-angle X-ray scattering measurement provides information about a periodic structure with a period of a few nanometers or more (i.e., information about the period and frequency of occurrence of the structure), which cannot be obtained through an ordinary X-ray diffraction. Thus, the α value is determined based on this information.

Particularly, the fractal shape parameter α value may be measured by the following method. Specifically, after background correction, the scattering intensity (I), scattering vector (k), and fractal shape parameter (α) of the small-angle X-ray scattering satisfy the following Equation (1). Thus, the α value may be determined based on a small-angle X-ray scattering curve plotted with abscissas k and ordinates 1.

$$I \propto k^{-\alpha} \qquad (1)$$

where $k = 4\pi\lambda^{-1} \sin\theta$,

In this equation, I: scattering intensity;
k: scattering vector (in $nm^{-1}$);
π: circular constant;
λ: wavelength of incoming X-ray (in nm); and
θ: X-ray scattering angle (where θ is obtained by multiplying the scanning angle of the detector by 0.5).

To obtain the small-angle X-ray scattering curve, a given specimen is irradiated with a monochromatized X-ray that has been narrowly converged through a slit and a block, and the X-ray scattered by the specimen is detected with the scanning angle of the detector changed. Next, the scattering vector (k) calculated by the above-described equation based on the X-ray scattering angle (θ) is plotted as an abscissa, and the background-corrected scattering intensity (I) is plotted as an ordinate. In this case, plotting both of these parameters on logarithmic scales will make the gradient of a tangential line with respect to the small-angle X-ray scattering curve at a certain k value equal to $-\alpha$, thus allowing for obtaining an $\alpha$ value.

Note that the background correction may be made by subtraction of the scattering intensity of only a measurement cell with no samples from the scattering intensity of a sample. In this case, if the target of the $\alpha$ value analysis has a size of D (nm), then D, the X-ray scattering angle $\theta$, and the wavelength k of the incident X-ray satisfy the Bragg equation (2D×sin $\theta$=$\lambda$). Thus, k and D meet the following equation:

$$D=2\pi k^{-1}$$

If such small-angle X-ray scattering has been measured for silica particles, analyzing the resultant small-angle X-ray scattering curve allows for obtaining an $\alpha$ value representing the frequency of occurrence of a periodic structure of each dimension in the structure of primary particles or their agglomerated particles. Note that during this measurement, the $\alpha$ value varies according to the breadth of the range of measurement. That is to say, as the range becomes narrower, the $\alpha$ value increases. Thus, the ranges of measurement are set to be 20-30 nm, 30-50 nm, and 50-70 nm, respectively, the $\alpha$ values of these three ranges are calculated, and their maximum value is determined to be an $\alpha$max value. In this embodiment, the silica particles have a BET specific surface area of 70 m$^2$/g to 120 m$^2$/g, and their primary particles have a particle size of approximately 18-26 nm. Accordingly, in a measurement range of less than 20 nm, only part of the surface of the primary particles is measured, and the $\alpha$ value increases. In this embodiment, the silica particles are in the form of primary particles or their agglomerated particles when used as an additive, and therefore, have their ranges of measurement defined as described above. In the case of silica particles, of which the BET specific surface area falls within the range described above, the $\alpha$ value decreases gradually and cannot have the maximum value when the measurement is made beyond 70 nm.

It is known that as the $\alpha$ value increases to approach 4, the particle loses its constitutive property more and more significantly and turns into a more perfect sphere. That is why it can be said that the larger the $\alpha$ value of the primary particles or their agglomerate structure is, the higher the degree of dispersion of the silica particles is. Therefore, if the $\alpha$max value were less than 2.9, the degree of dispersion of the silica particles would be too low to avoid producing a silica agglomerate or a toner agglomerate when the particles are used as an external additive to a toner, thus possibly causing a decrease in color density and/or color missing during printing. The $\alpha$max value is suitably equal to or greater than 3.0, and more suitably equal to or greater than 3.1. The upper limit of the $\alpha$max value is not particularly limited and is suitably as close to 4 as possible, but is more suitably equal to or smaller than 3.8 in practice.

In this embodiment, the silica particles suitably have a particle density of 2.23 g/cm$^3$ or more as measured by an He gas pycnometer method. If the silica particles had a particle density of less than 2.23 g/cm$^3$, the silica particles would be elastically deformed so significantly when pressed onto a photoreceptor during an electrophotographic printing process as to cause some damage onto the surface of the photoreceptor. This would cause filming, which could lead to a decrease in color density and/or color missing during printing. The silica particles more suitably have a particle density of 2.24 g/cm$^3$ or more, because in that case, there is almost no concern about such a decrease in color density and/or color missing during printing.

In this embodiment, the silica particles suitably have an apparent density of 20 g/l to 35 g/l. The silica particles more suitably have an apparent density of 21 g/l to 30 g/l, and even more suitably have an apparent density of 21 g/l to 27 g/l. The apparent density is measured by a pigment testing method compliant with the JIS 5101-12-1 standard. If the apparent density were less than 20 g/l, it would be difficult to carry out the surface treatment with the silicone oil uniformly, thus possibly causing a variation in the degree of the surface treatment achieved. Specifically, a variation in the amount of the silicone oil covering the surface of the silica particles from one location to another in a processing batch would allow the silicone oil-treated silica particles to disperse non-uniformly or a toner agglomerate to be formed when the silicone oil-treated silica particles are used as an external additive to a toner. This would cause a decrease in color density and/or color missing during printing. On the other hand, if the apparent density were greater than 35 g/l, the silicone oil treatment would be performed on the silica particles agglomerated. In that case, adding such silicone oil-treated silica particles to a toner could form a toner agglomerate, thus causing a decrease in color density and/or color missing during printing. Note that the apparent density may be adjusted by any known method without limitation. Specifically, if the apparent density is below the range defined above, then the apparent density may be adjusted to fall within the range through compression using a deaerator press, for example.

A silica particle according to this embodiment is surface-treated with silicone oil to turn into a silicone oil-treated silica particle. The silicone oil for use in this embodiment is not particularly limited but may be any known one without limitation. Specific examples of such silicone oil include dimethyl silicone oil, methylphenyl silicone oil, methylhydrogen silicone oil, amino-denatured silicone oil, epoxy-denatured silicone oil, carboxy-denatured silicone oil, carbinol-denatured silicone oil, polyether-denatured silicone oil, alkyl-denatured silicone oil, and fluorine-denatured silicone oil.

The viscosity of the silicone oil is not particularly limited but is suitably any value falling within the range of 20 to 500 cSt. If the viscosity of the silicone oil were below this range, then the silicone oil would become volatile, thus often making it difficult to deposit a predetermined amount of the silicone oil on the surface of the silica particles. On the other hand, if the viscosity of the silicone oil were above this range, then the treatment would often be done non-uniformly. Optionally, two or more types of silicone oil with different functional groups may be used in mixture. Alternatively, two or more types of silicone oil with the same functional group but with different viscosity or molecular weight distributions may also be used in mixture.

The method for performing the surface treatment with the silicone oil is not particularly limited. For example, the surface treatment may be carried out as either a wet process or a dry process. In the wet process, the silicone oil is dissolved in a solvent such as toluene, the silica particles are allowed to disperse in the solution, the solvent is vaporized to deposit the silicone oil on the surface of the silica particles, and then a predetermined type of heat treatment is conducted. In the dry process, on the other hand, the silicone oil is sprayed against the silica particles while being mixed with the particles in a mixer or a fluidized bed, thereby depositing the silicone oil on the surface of the silica particles, and then a predetermined type of heat treatment is conducted.

Of these wet and dry processes, the dry process is superior to the wet process for the following two reasons. Firstly, the dry process allows the silica particles to be treated more uniformly. Secondly, the dry process uses no organic solvents and is more beneficial than the wet process in terms of cost, safety, and environmental protection.

During the dry process, the silicone oil is suitably sprayed in a well-mixed state to get the silicone oil treatment done uniformly. It is recommended that the silica fine powder be mixed in a mixer for the following reason. The mixing process with a mixer allows the silica particles to collide against each other, and exchange the silicone oil between them, more frequently than the mixing process using a fluidized bed, thus increasing the likelihood of forming even more uniformly surface-treated silica particles.

When a stirring process is performed in a mixer during the silicone oil treatment, the rpm of the stirring process and the shape of the impeller are suitably determined such that the silica particles are fluidized and stirred up with stability. The vessel may or may not be closed hermetically.

In this embodiment, if the silicone oil treatment is carried out as the dry process mentioned above, the silicone oil to be sprayed suitably has a spray particle size of 80 μm or less. Setting the spray particle size to fall within this range facilitates uniform treatment. As a silicone oil sprayer, a single-fluid nozzle, a two-fluid nozzle or any other suitable nozzle may be used, for example. Among other things, it is recommended to use the two-fluid nozzle because this type of nozzle allows the oil to be sprayed at a smaller particle size.

In the silicone oil treatment according to this embodiment, depositing the silicone oil on the surface of the silica particles is suitably followed by a predetermined type of heat treatment. The heat treatment may be conducted under any environment, including, without limitation, an environment having a temperature of 100-300° C.

In the silicone oil-treated silica particle, the silicone oil may be either bonded to the silica particle or may just be physically adsorbed onto its surface. In the silicone oil bonded to the silica particle, a silanol group is present on the surface of the silica particle. Therefore, the oil is immobilized onto the silanol group via a weak chemical bond such as a hydrogen bond. Also, the silicone oil simply deposited on the surface can be easily liberated from the silicone oil-treated silica particle with a hydrocarbon-based organic solvent such as hexane. Such silicone oil to be easily liberated from the silicone oil-treated silica particle with an organic solvent will be hereinafter referred to as "free silicone oil."

The amount of the free silicone oil may be measured as the amount of the silicone oil eluted when the silicone oil-treated silica particle is immersed in normal hexane. Specifically, the amount may be calculated by the following method. First of all, 0.5 g of silicone oil-treated silica particles as a sample and 32 ml of normal hexane are put into a centrifugal tube with a capacity of 50 ml, ultrasonic-cleaned for 30 minutes with an ultrasonic cleaner (e.g., 1510 JMTH manufactured by Yamato Scientific Co., Ltd.), and allowed to be suspended. The suspension thus obtained is centrifuged to separate and collect a solid phase (i.e., silica). Next, 32 ml of normal hexane is further added to the silica collected. The mixture is then repeatedly subjected to a set of ultrasonic cleaning and centrifugal separation process steps three times in total to separate and collect the solid phase (silica). Next, the solid phase is dried at a reduced pressure at 120° C. for 12 hours, thereby obtaining a dry powder. The carbon content of this powder is measured with a total nitrogen and total carbon measuring system (e.g., Sumigraph NC-22F manufactured by Sumika Chemical Analysis Service, Ltd.) by an oxygen circulation combustion method. The total carbon content in 0.5 g of the sample is measured in advance, and the amount of the free silicone oil extracted is calculated as the difference from the total carbon content. Specifically, the carbon content corresponding to the difference is converted into an amount of silicone oil including dimethylsiloxane as a main chain and having the structural formula —$(Si(CH_3)_2$—$O)_n$—. The amount of such silicone oil may be regarded as the amount of the free silicone oil.

The amount of the free silicone oil suitably accounts for 2.0 mass % to 5.0 mass %, more suitably 2.0 mass % to 4.0 mass %, with respect to the silica particle body. If the amount of the free silicone oil were less than 2.0 mass %, the toner and carrier would produce frictional electrification to varying degrees from one location to another when the silicone oil-treated silica particles are used as an external additive to the toner, thus increasing the likelihood of causing a decrease in color density and/or color missing during printing. On the other hand, if the amount of the free silicone oil were more than 5.0 mass %, the excessive free silicone oil would more likely allow the toner to agglomerate when the silicone oil-treated silica particles are used as an external additive to the toner, thus possibly causing a decrease in color density and/or color missing during printing. The amount of the free silicone oil varies depending on the condition on which the silica particles are surface-treated with the silicone oil.

In this embodiment, a surface-treated styrene acrylic resin particle, obtained by adding 2 parts by mass of the silicone oil-treated silica particle to 100 parts by mass of a styrene acrylic resin particle having a particle size median of 5 μm to 8 μm, a glass transition temperature of 58-63° C., a melt flow rate of 2.2-5.0 g/10 minutes (at 150° C. and 21.1 N), and a weight average molecular weight of 220,000-280,000, has a degree of agglomeration of 18% or less. The degree of agglomeration is suitably equal to or smaller than 15% and more suitably equal to or smaller than 13%. The styrene acrylic resin particle suitably has a glass transition temperature of 58.6-62.4° C., a melt flow rate of 2.5-4.7 g/10 minutes (at 150° C. and 21.1 N), and a weight average molecular weight of 230,000-270,000. As used herein, the "particle size median" refers to a median diameter (median size) of a volume distribution measured with a particle size analyzer. Specific examples of styrene acrylic resin particles with such physical properties include Highmer SB-317 manufactured by Sanyo Chemical Industries, Ltd. In this case, the styrene acrylic resin particle is a pseudo-toner. The degree of agglomeration is measured with a powder tester. A degree of agglomeration of more than 18% would increase the amount of the toner agglomerate, thus increasing the likelihood of causing a decrease in color density and/or color missing during printing. Therefore, the lower the degree of agglomeration, the better. Nevertheless, a silicone oil-treated silica particle including a silica particle body with a BET specific surface area of 70 $m^2/g$ to 120 $m^2/g$ normally has a degree of agglomeration of 5% or more. Generally speaking, supposing a surface treatment is carried out with the same finishing agent, the larger the BET specific surface area of a silica particle body is, the lower the degree of agglomeration tends to be. Also, a large amount of the free silicone oil or a low apparent density of the silica particle body tends to result in a high degree of agglomeration.

Next, it will be described how to make a silicone oil-treated silica particle according to this embodiment. Silicone oil is added to the silica particle body to coat the surface of the silica particle body with the silicone oil. The silicone oil for use in this embodiment is suitably the one mentioned above.

In this embodiment, an arbitrary amount of the silicone oil may be added to the surface of the particle body as long as the surface of the particle can be made sufficiently hydrophobic and as long as the amount of the free silicone oil of the resultant silicone oil-treated silica particle falls within the range described above. For example, if the amount of the free silicone oil is set to be 2.0 mass % to 5.0 mass % with respect to the silica particle body, the amount of the silicone oil added may account for approximately 6-18 mass % with respect to the mass of the silica particle body. If the amount of the free silicone oil is set to be 2.0 mass % to 4.0 mass % with respect to the silica particle body, the amount of the silicone oil added may account for approximately 6-15 mass % with respect to the mass of the silica particle body. The amount of the silicone oil to be added is not always the same, but varies depending on the type of the silicone oil used and the specific surface area of the silica particle. For example, if the silica particle serving as a base material has a specific surface area of 100 $m^2/g$, the amount of the silicone oil to be added suitably accounts for 8-16 parts by mass, and more suitably accounts for 10-14 parts by mass, with respect to 100 parts by mass of the base material silica. If the silica particle has a specific surface area of 70 $m^2/g$, the amount of the silicone oil to be added suitably accounts for 6-14 parts by mass, and more suitably accounts for 8-12 parts by mass, with respect to 100 parts by mass of the silica.

Any coating method may be used without limitation for the silicone oil, as long as the surface of the silica particle body can be coated with the silicone oil. For example, the surface treatment may be carried out as either a wet process or a dry process. In the wet process, the silicone oil is dissolved in a solvent such as toluene, the silica particles are allowed to disperse in the solution, the solvent is vaporized to deposit the silicone oil on the surface of the silica particles, and then a predetermined type of heat treatment is conducted. In the dry process, on the other hand, the silicone oil is sprayed against the silica particles while being mixed with the particles in a mixer or a fluidized bed, thereby depositing the silicone oil on the surface of the silica particles, and then a predetermined type of heat treatment is conducted.

Of these wet and dry processes, the dry process is superior to the wet process for the following two reasons. Firstly, the dry process allows the silica particles to be treated more uniformly. Secondly, the dry process uses no organic solvents and is more beneficial than the wet process in terms of cost, safety, and environmental protection.

During the dry process, the silicone oil is suitably sprayed in a well-mixed state to get the silicone oil treatment done uniformly. It is recommended that the silica fine powder be mixed in a mixer for the following reason. The mixing process with a mixer allows the silica particles to collide against each other, and exchange the silicone oil between them, more frequently than the mixing process using a fluidized bed, thus increasing the likelihood of forming even more uniformly surface-treated silica particles.

When a stirring process is performed in a mixer during the silicone oil treatment, the rpm of the stirring process and the shape of the impeller are suitably determined such that the silica particles are fluidized and stirred up with stability. The vessel may or may not be closed hermetically.

In this embodiment, if the silicone oil treatment is carried out as the dry process mentioned above, the silicone oil to be sprayed suitably has a spray particle size of 80 μm or less. Setting the spray particle size to fall within this range facilitates uniform treatment. As a silicone oil sprayer, a single-fluid nozzle, a two-fluid nozzle, or any other suitable nozzle may be used, for example. Among other things, it is recommended to use the two-fluid nozzle because this type of nozzle allows the oil to be sprayed at a smaller particle size.

In the silicone oil treatment according to the present invention, depositing the silicone oil on the surface of the silica particles is suitably followed by a predetermined type of heat treatment. The heat treatment may be conducted under any environment, including, without limitation, an environment having a temperature of 100-300° C.

The reaction time may be determined appropriately based on the reactivity of the silicone oil used. Generally, a good reaction rate is achievable within 24 hours.

After the reaction, an inert gas such as nitrogen gas is introduced and allowed to flow to complete the reaction. Thereafter, the residual solvent is removed.

(Electrophotographic Toner)

One of features of an electrophotographic toner according to this embodiment is that a toner made of a binder resin includes, as an external additive, the silicone oil-treated silica particles according to this embodiment. This imparts good flowability to the toner and significantly reduces the formation of a toner agglomerate, thus reducing color missing, density irregularity, and other kinds of failure during printing.

Any known resin may be used without limitation as the binder resin for the toner. Examples of those binder resins include a styrene-acrylic copolymer resin, a polyester resin, and an epoxy resin. Also, this embodiment is applicable regardless of how the toner has been made. For example, this embodiment is applicable to not only a toner obtained by pulverization and kneading processes but also a toner obtained by suspension polymerization and emulsion polymerization as well.

In an electrophotographic toner according to this embodiment, the external additive comprised of silicone oil-treated silica particles according to this embodiment may be added in any amount without limitation, as long as the resultant toner exhibits desired characteristics. In general, the amount of the additive suitably accounts for 0.05-5 mass %, and more suitably accounts for 0.1-4 mass %. Also, the external additive added to the toner according to this embodiment may consist essentially of the silicone oil-treated silica particles according to this embodiment, or may be mixed with any other external additive depending on the target performance. In the latter case, the total amount of the external additives suitably falls within the range specified above. The external additive may be added to the toner by any known method without limitation.

An electrophotographic toner according to this embodiment may include any combination of other known constituents. Specifically, any materials routinely used in the pertinent art, including, without limitation, a black colorant, cyan, magenta, yellow and other colorants, an electrification control agent, and a release agent such as wax, may be adopted.

An electrophotographic toner according to this embodiment may be used as either a black toner or a color toner by being mixed with an appropriate colorant. Also, the toner may be used effectively in an electrophotographic system regardless of its constituent material, i.e., no matter whether the system is made of a single magnetic component, a single non-magnetic component, dual non-magnetic components, or any other component(s).

EXAMPLES

Specific examples and comparative examples will now be described as illustrative and reference examples of the embodiment described above. Note that the present invention is in no way limited to the following examples. The physical properties of the silica particles and silicone oil-treated silica particles were measured and evaluated by the following methods.

(Measurement of Specific Surface Area)

The specific surface areas of the silica particles and silicone oil-treated silica particles were measured by a BET single-point determination method based on the amount of nitrogen adsorbed using a specific surface area measuring system SA-1000 manufactured by Shibata Scientific Technology, Ltd.

(Measurement of Particle Density)

A 10 ml sample insert of a dry automatic densimeter AccuPyc 1330 manufactured by Shimadzu Corporation was used with a He gas supplied at a pressure of 0.16 Pa. The measuring temperature of the densimeter was maintained at 25° C. with hot water circulating. As a pre-treatment, the sample was uniaxially pressed under the following conditions to increase the amount of the sample injected. A cemented carbide press die with a diameter of 50 mm and a height of 75 mm was filled with silica particles, which were compacted under a pressure of 15 tons with MH-15 TON press (having a piston diameter of 55 mm) manufactured by MASADA SEISAKUSHO. The pressure was held for about 2 seconds before being lowered. Then, the sample was unloaded from the die. The compacted sample was dried for eight hours at a temperature of 200° C. and under a pressure of −0.095 PaG or less in a vacuum drier and then placed under a reduced pressure in the drier to let its temperature fall to room temperature. Then, the sample was subjected to measurement.

(Measurement of α Value by Small-Angle X-Ray Scattering)

A though hole of a sample holder with a length of 40 mm, a width of 5 mm, and a thickness of 1 mm was filled with silica particles. The sample filling the through hole was kept sandwiched at both ends with a polypropylene film with a thickness of 6 μm, and then subjected to measurement. The measurement was carried out with a dual-axis small-angle X-ray scattering system (M18XHF22) manufactured by Mac Science and equipped with Kratzky U-slit using a Cu—Kα ray as an incoming X-ray at a tube voltage of 40 kV, a tube current of 300 mA, a slit width of 10 μm, and a detector scan angle of 0.025-0.900 degrees. The measurement was carried out five times per sample, and the average was defined as a measured value. The small-angle X-ray scattering curves thus obtained were analyzed to calculate α values for periodic structures of multiple different dimensions included within respective ranges of 20-30 nm, 30-50 nm, and 50-70 nm, and the maximum value was defined as an αmax value. The method of measuring the α value the present inventors adopted is described in detail in Japanese Patent No. 4756040. Note that the content of the above-cited patent is hereby incorporated by reference.

(Measurement of Apparent Density)

The apparent density was measured by a pigment testing method compliant with the JIS 5101-12-1 standard.

(Method for Calculating the Amounts of Silica Surface Silicone Oil and Free Silicone Oil)

First, 0.5 g of the sample and 32 ml of normal hexane were put into a centrifugal tube with a capacity of 50 ml, ultrasonic-dispersed for 30 minutes with an ultrasonic cleaner (e.g., 1510 JMTH manufactured by Yamato Scientific Co., Ltd.), and allowed to be suspended. The suspension thus obtained was centrifuged to separate and collect a solid phase (i.e., silica). Next, 32 ml of normal hexane was further added to the silica collected. The mixture was then repeatedly subjected to a set of ultrasonic dispersion and centrifugal separation process steps three times in total. Next, the solid phase was dried at a reduced pressure at 120° C. for 12 hours, thereby obtaining a dry powder. The carbon content of this powder was measured with Sumigraph NC-22F manufactured by Sumika Chemical Analysis Service, Ltd. The total carbon content in 0.5 g of the sample was measured in advance, and the amount of the free silicone oil extracted was calculated as the difference from the total carbon content. Also, based on the total carbon content in 0.5 g of the sample that had been measured in advance, the total amount of the silicone oil on the surface of the silicone oil-treated silica particle was calculated.

Specifically, the carbon content corresponding to the difference was converted into an amount of silicone oil including dimethyl siloxane as a main chain and having the structural formula —$(Si(CH_3)_2-O)_n$—. The amount of such silicone oil was regarded as the amount of the free silicone oil.

(Evaluation of Degree of Agglomeration)

(1. Preparation of Pseudo-Toner)

A styrene-acrylic resin (Highmer SB-317 manufactured by Sanyo Chemical Industries, Ltd.) was pulverized with a jet mill to obtain a resin powder having a median diameter of 7 μm as measured by a laser scattering/diffraction particle size analyzer (LMS-30 manufactured by Seishin Enterprise Co., Ltd.). Highmer SB-317 has a glass transition temperature of 60° C., a number average molecular weight of 4,000, a weight average molecular weight of 250,000, and a melt flow rate of 3.5 g/10 minutes.

First, 35 g of the resin powder thus obtained, 0.7 g of the silicone oil-treated silica particles thus obtained (as an external additive), and 200 g of 5 mm glass beads (e.g., Glass Beads BZ-5 manufactured by As One Corporation) were put into an Aiboy (trade name; manufactured by As One Corporation) wide-mouthed bottle with a capacity of 250 ml. Then, the wide-mouthed bottle was transversally loaded into a shaker (KM Shaker V-SX manufactured by Iwaki Co., Ltd.) and shaken for 10 minutes under the conditions including a shake width of 4 cm and a shake velocity of 280 revolutions per minute.

After having been shaken, the glass beads were sieved out with a powder tester (PT-X manufactured by Hosokawa Micron Group). In this case, the sieve had an aperture of 1.7 mm, an amplitude of 1 mm, and a shake duration of 180 seconds. The powder thus obtained was further left for 24 hours or more under the conditions including a temperature of 25° C. and a relative humidity of 50%, and the resultant powder was collected as a pseudo-toner.

(2. Measurement of Degree of Agglomeration)

The degree of agglomeration of the pseudo-toner thus collected was measured with a powder tester (PT-X manufactured by Hosokawa Micron Group). The measurement was carried out on 2 g of the pseudo-toner. Three different sieves with apertures of 150 μm, 75 μm, and 45 μm, respectively, in the descending order were used. The amplitude was 1 mm and the shake duration was 30 seconds. The degree of agglomeration is given by the following equation. The smaller the degree of agglomeration is, the smaller the amount of the toner or silica agglomerated would be (i.e., the higher the quality of the toner may be rated).

Degree of Agglomeration (%)=($A$+0.6×$B$+0.2×$C$)/2×100

In this equation, the values A, B, and C represent the following:

A: the amount (g) of the pseudo-toner remaining on the 150 μm sieve;

B: the amount (g) of the pseudo-toner remaining on the 75 μm sieve; and

C: the amount (g) of the pseudo-toner remaining on the 45 μm sieve.

(Method for Evaluation in Terms of Color Missing and Density Irregularity)

Toner cartridges of a commercially available photocopier were filled with electrophotographic toners, which had been prepared with the silicone oil-treated silica particles according to the respective examples and comparative examples used as external additives, to continuously output 2,000 solid images of 5 cm square onto sheets of photocopying paper. Thereafter, 500 more solid images of 5 cm square were further output continuously to visually count the number of images with color missing or density irregularity among those 500 solid images. As for color missing, any image with three or more color missing spots was counted among images with color missing. Each of these toners was rated as falling under any of the following five grades:

Grade 5: a toner forming 0 images with color missing or density irregularity;

Grade 4: a toner forming 1-5 images with color missing or density irregularity;

Grade 3: a toner forming 6-20 images with color missing or density irregularity;

Grade 2: a toner forming 21-40 images with color missing or density irregularity; and Grade 1: a toner forming 41 or more images with color missing or density irregularity.

Examples and Comparative Examples

First to Fourth Examples

<Base Material Producing Process Step>

An encapsulated triple-port burner having a center tube with an inside diameter of 100 mm was put in a closed reactor. A mixture in which silicon tetra chloride ($SiCl_4$; hereinafter referred to as "STC") gas and hydrogen as source gases and the air and oxygen as supporting gases had been premixed with each other was supplied to the center tube. Hydrogen and the air were supplied to the first annular tube to form pilot flames. The air was allowed to flow through the second annular tube to prevent silica particles from being deposited on the burner. The source gas including 100 mol % of STC was supplied with hydrogen, of which the theoretical hydrogen content was 1.15 times as large as that of the source gas. Changing the flow rates of the source gases and supporting gases to be introduced into the center tube allowed the adiabatic flame temperatures to be adjusted to the ones shown in Table 1, and also caused the STC gas to produce flame hydrolysis. The adiabatic flame temperature may be calculated by the method described in "Study on the Production of Fumed Silica" (Surface Science 1984, Vol. 5, No. 1, pp. 35-39), the content of which is hereby incorporated by reference. During the combustion, the pressure in the reactor was always equal to or higher than 10 kPaG. Each fumed silica thus obtained had an apparent density of 16-19 g/l and compacted with a deaerator press to adjust its apparent density to the range of 22-23 g/L to be used as a silica particle for the base material.

<Surface Treatment Process Step>

First, 400 g of the silica particles of the base material thus obtained were put into a mixer container with a capacity of 35 L and was supplied with nitrogen while being stirred up, thereby creating a nitrogen atmosphere in the container and heating the container to 270° C. The container was left open without being closed hermetically, and dimethyl silicone oil with a viscosity of 50 cSt was sprayed through a two-fluid nozzle toward the silica particles of the base material to the respective amounts shown in Table 1. After the oil had been sprayed, the mixture was stirred up for one hour with the atmosphere and temperature maintained, thereby obtaining silicone oil-treated silica particles. The manufacturing conditions and evaluation results of their physical properties are shown in Table 1.

Fifth Example

In the base material producing process step, the source gas to be supplied to the center tube of the triple-port burner was changed from STC into methyltrichlorosilane. The source gas including 100 mol % of methyltrichlorosilane was supplied with hydrogen, of which the theoretical hydrogen content was 1.50 times as large as that of the source gas. Furthermore, changing the flow rates of the source gases and supporting gases to be introduced into the center tube allowed the adiabatic flame temperature to be adjusted to 2,040° C. and also caused methyltrichlorosilane to produce flame hydrolysis. Furthermore, changing the conditions for compacting the fumed silica thus obtained using the deaerator press allowed the apparent density of the silica particles of the base material to be adjusted to 27 g/L. The other manufacturing conditions were the same as those adopted in the first example. The manufacturing conditions and evaluation results of their physical properties are shown in Table 1.

Sixth Example

In the surface treatment process step, the amount of dimethyl silicone oil sprayed through the two-fluid nozzle toward the silica particles of the base material was changed into 14 wt %. The other manufacturing conditions were the same as those adopted in the first example. The manufacturing conditions and evaluation results of their physical properties are shown in Table 1.

Seventh Example

In the base material producing process step, changing the conditions for compacting the fumed silica using the deaerator press allowed the apparent density of the silica particles of the base material to be adjusted to 39 g/L. The other manufacturing conditions were the same as those adopted in the first example. The manufacturing conditions and evaluation results of their physical properties are shown in Table 1.

Eighth Example

In the base material producing process step, the composition of the source gas introduced into the center tube was changed to consist essentially of 90 mol % of STC and 10 mol % of methyldichlorosilane. Also, this source gas was supplied with hydrogen, of which the theoretical hydrogen content was 1.30 times as large as that of the source gas. Furthermore, changing the flow rates of the source gases and supporting gases to be introduced into the center tube allowed the adiabatic flame temperature to be adjusted to 2,140° C. and also caused methyldichlorosilane to produce flame hydrolysis. The other manufacturing conditions were the same as those adopted in the first example. The manufacturing conditions and evaluation results of their physical properties are shown in Table 1.

TABLE 1

| | Manufacturing conditions | | | Physical properties | | | | | | | Evaluation | |
|---|---|---|---|---|---|---|---|---|---|---|---|---|
| | Materials (in mol %) | Adiabatic flame temperature (° C.) | Silicone oil added (wt %) | Silica particle body's BET specific surface area ($m^2/g$) | Silica particle body's apparent density (g/L) | Silica particle body's fractal shape parameter $\alpha$max | Silica particle density ($g/cm^3$) | Surface-treated silica's BET specific surface area ($m^2/g$) | Surface-treated silica's silicone oil amount (wt %) | Surface-treated silica's free silicone oil amount (wt %) | Degree of agglomeration (%) | Color missing and density irregularity |
| Example 1 | STC (100) | 1980 | 12 | 85 | 23 | 3.2 | 2.24 | 49 | 11 | 3 | 12 | 5 |
| Example 2 | STC (100) | 2000 | 10 | 75 | 22 | 3.2 | 2.24 | 43 | 10 | 4 | 15 | 4 |
| Example 3 | STC (100) | 1965 | 14 | 100 | 22 | 2.9 | 2.24 | 58 | 13 | 4 | 10 | 4 |
| Example 4 | STC (100) | 1150 | 12 | 85 | 22 | 3.0 | 2.22 | 52 | 10 | 3 | 13 | 3 |
| Example 5 | Methyltrichlorosilane (100) | 2040 | 12 | 83 | 27 | 3.0 | 2.26 | 48 | 11 | 3 | 14 | 4 |
| Example 6 | STC (100) | 1980 | 14 | 85 | 23 | 3.2 | 2.24 | 47 | 12 | 5 | 13 | 5 |
| Example 7 | STC (100) | 1980 | 12 | 85 | 39 | 3.2 | 2.24 | 48 | 11 | 3 | 16 | 3 |
| Example 8 | STC (90) and methyldichlorosilane (10) | 2140 | 12 | 85 | 23 | 2.8 | 2.24 | 53 | 10 | 2 | 17 | 3 |

First Comparative Example

In the base material producing process step, changing the flow rates of the source gases and supporting gases to be introduced into the center tube allowed the adiabatic flame temperature to be adjusted to 2050° C. Also, changing the conditions for compacting the fumed silica thus obtained using the deaerator press allowed the apparent density of the silica particles of the base material to be adjusted to 25 g/L. Furthermore, in the surface treatment process step, the amount of dimethyl silicone oil sprayed toward the silica particles of the base material was changed into 9 wt %. The other manufacturing conditions were the same as those adopted in the first example. The manufacturing conditions and evaluation results of their physical properties are shown in Table 2.

Second Comparative Example

In the base material producing process step, changing the flow rates of the source gases and supporting gases to be introduced into the center tube allowed the adiabatic flame temperature to be adjusted to 1,870° C. Also, changing the conditions for compacting the fumed silica thus obtained using the deaerator press allowed the apparent density of the silica particles of the base material to be adjusted to 23 g/L. Furthermore, in the surface treatment process step, the amount of dimethyl silicone oil sprayed toward the silica particles of the base material was changed into 20 wt %. The other manufacturing conditions were the same as those adopted in the first example. The manufacturing conditions and evaluation results of their physical properties are shown in Table 2.

Third Comparative Example

In the base material producing process step, changing the conditions for compacting the fumed silica using the deaerator press allowed the apparent density of the silica particles of the base material to be adjusted to 19 g/L. The other manufacturing conditions were the same as those adopted in the first example. The manufacturing conditions and evaluation results of their physical properties are shown in Table 2.

Fourth Comparative Example

In the surface treatment process step, the amount of dimethyl silicone oil sprayed through the two-fluid nozzle toward the silica particles of the base material was changed into 9 wt %. The other manufacturing conditions were the same as those adopted in the first example. The manufacturing conditions and evaluation results of their physical properties are shown in Table 2.

Fifth Comparative Example

In the base material producing process step, changing the conditions for compacting the fumed silica using the deaerator press allowed the apparent density of the silica particles of the base material to be adjusted to 24 g/L. In the surface treatment process step, the amount of dimethyl silicone oil sprayed through the two-fluid nozzle toward the silica particles of the base material was changed into 20 wt %. The other manufacturing conditions were the same as those adopted in the first example. The manufacturing conditions and evaluation results of their physical properties are shown in Table 2.

TABLE 2

| | Manufacturing conditions | | | Physical properties | | | | | | | Evaluation | |
|---|---|---|---|---|---|---|---|---|---|---|---|---|
| | Materials (in mol %) | Adiabatic flame temperature (°C.) | Silicone oil added (wt %) | Silica particle body's BET specific surface area (m²/g) | Silica particle body's apparent density (g/L) | Silica particle body's fractal shape parameter αmax | Silica particle body's particle density (g/cm³) | Surface-treated silica's BET specific surface area (m²/g) | Surface-treated silica's silicone oil amount (wt %) | Surface-treated silica's free silicone oil amount (wt %) | Degree of agglomeration (%) | Color missing and density irregularity |
| Comparative Example 1 | STC (100) | 2050 | 9 | 65 | 25 | 3.2 | 2.25 | 38 | 8 | 3 | 30 | 1 |
| Comparative Example 2 | STC (100) | 1870 | 20 | 140 | 23 | 2.7 | 2.24 | 85 | 16 | 4 | 8 | 1 |
| Comparative Example 3 | STC (100) | 1980 | 12 | 85 | 19 | 3.2 | 2.24 | 49 | 10 | 3 | 22 | 2 |
| Comparative Example 4 | STC (100) | 1980 | 9 | 85 | 23 | 3.2 | 2.24 | 50 | 9 | 1 | 12 | 2 |
| Comparative Example 5 | STC (100) | 1980 | 20 | 85 | 24 | 3.2 | 2.24 | 43 | 15 | 10 | 20 | 2 |

In the silica particles, silicone oil-treated silica particles, and toners using them according to the first to eighth examples, the silica particles had a BET specific surface area of 70 m²/g to 120 m²/g (more specifically, 75 m²/g to 100 m²/g), the amount of the free silicone oil accounted for 2.0 mass % to 5.0 mass % with respect to the silica particle body, and the pseudo toner had a degree of agglomeration of 18% or less. Thus, it can be seen that those particles and toners satisfy all of these three conditions and can be used as a toner external additive of good print quality which would hardly cause color missing or density irregularity during printing.

In the silica particles, silicone oil-treated silica particles, and toner using them according to the first comparative example, the BET specific surface area was 65 m²/g, which is less than 70 m²/g, and the degree of agglomeration was as high as 30%, thus causing significant color missing and density irregularity during printing.

In the silica particles, silicone oil-treated silica particles, and toner using them according to the second comparative example, the BET specific surface area was 140 m²/g, which is greater than 120 m²/g, thus causing significant color missing and density irregularity during printing.

In the silica particles, silicone oil-treated silica particles, and toner using them according to the third comparative example, the pseudo toner had a degree of agglomeration of 25%, which is greater than 18%, thus causing significant color missing and density irregularity during printing.

In the silica particles, silicone oil-treated silica particles, and toner using them according to the fourth comparative example, the free silicon oil accounted for 1 mass %, which is less than 2.0 mass %, with respect to the silica particle body, thus causing significant color missing and density irregularity during printing.

In the silica particles, silicone oil-treated silica particles, and toner using them according to the fifth comparative example, the free silicon oil accounted for 10 mass %, which is much greater than 5.0 mass %, with respect to the silica particle body, thus causing significant color missing and density irregularity during printing.

Other Embodiments

Note that the embodiments and examples described above are mere examples of the present invention. In other words, the present invention is in no way limited to any of these examples, which may be combined with, or partially replaced by, existing technology known to, or used routinely by, those skilled in the art. In addition, various modifications of the present disclosure, which would readily occur to one of ordinary skill in the art, also fall within the scope of the present invention.

The invention claimed is:

1. A silicone oil-treated silica particle comprising a silica particle body and silicone oil, wherein:
    the silica particle body has a BET specific surface area of 70 m²/g to 120 m²/g,
    the silica particle body has been surface-treated with the silicone oil,
    the silica particle body is fumed silica,
    the silica particle body has a particle density of 2.23 g/cm³ or more as measured by a helium (He) gas pycnometer, with an apparent density of 20 g/l to 35 g/l,
    the amount of free silicone oil liberated from the surface of the silica particle body in the silicone oil accounts for 2.0 mass % to 5.0 mass % with respect to the silica particle body,
    a surface-treated styrene acrylic resin particle, in which 2 parts by mass of the silicone oil-treated silica particle has been added to 100 parts by mass of a styrene acrylic resin particle having a particle size median of 5 um to 8 um, has a degree of agglomeration of 18% or less, and
    wherein respective fractal shape parameter a values of the silica particle body in measurement ranges of 20-30 nms, 30-40 nm, and 50-70 nm have a maximum value αmax of 2.9 or more.

2. An electrophotographic toner comprising, as an external additive, the silicone oil-treated silica particle of claim 1.

3. A method of making a silicone oil-treated silica particle, the method comprising the steps of:
    providing a silica particle body having a BET specific surface area of 70 m²/g to 120 m²/g; and
    adding silicone oil to the silica particle body to coat the surface of the silica particle body with the silicone oil, thereby obtaining the silicone oil-treated silica particle of claim 1.

4. The silicone oil-treated silica particle of claim 1, wherein:

the silica particle body has a particle density of 2.24 g/cm$^3$ or more as measured by an He gas pycnometer method.

5. The silicone oil-treated silica particle of claim 1, wherein: the silica particle body has an apparent density of 21 g/l to 27 g/l.

\* \* \* \* \*